(12) United States Patent
Noreña Franco et al.

(10) Patent No.: US 10,240,093 B2
(45) Date of Patent: Mar. 26, 2019

(54) METHOD AND EQUIPMENT FOR PRODUCING HYDROCARBONS BY CATALYTIC DECOMPOSITION OF PLASTIC WASTE PRODUCTS IN A SINGLE STEP

(71) Applicant: NEWPEK S.A. DE C.V., Nuevo León (MX)

(72) Inventors: Luis Noreña Franco, Distrito Federal (MX); Julia Aguilar Pliego, Distrito Federal (MX); Mirella Gutiérrez Arzaluz, Huixquilucan (MX); Maricela Sánchez Sánchez, Ecatepec (MX); Luis Alberto Villareal Cárdenas, Coahuila (MX); Andrés Rosas Camacho, Tialnepantia (MX); Arturo Cisneros Farías, Coahuila (MX); Enrique Saldivar Guerra, Coahuila (MX); Ivan Alejandro De La Peña Mireles, Nvo. León (MX); José Ramiro Infante Martínez, Coahuila (MX)

(73) Assignee: NEWPEK S.A. DE C.V., Nuevo Leon (MX)

( * ) Notice: Subject to any disclaimer, the term of this patent is extended or adjusted under 35 U.S.C. 154(b) by 0 days.

(21) Appl. No.: 14/906,810

(22) PCT Filed: Jul. 25, 2013

(86) PCT No.: PCT/MX2013/000095
§ 371 (c)(1),
(2) Date: Jan. 21, 2016

(87) PCT Pub. No.: WO2015/012676
PCT Pub. Date: Jan. 29, 2015

(65) Prior Publication Data
US 2016/0160127 A1 Jun. 9, 2016

(51) Int. Cl.
*C07C 4/00* (2006.01)
*C10G 1/10* (2006.01)
(Continued)

(52) U.S. Cl.
CPC .............. *C10G 1/10* (2013.01); *C08J 11/16* (2013.01); *C10G 1/006* (2013.01); *C10G 7/00* (2013.01);
(Continued)

(58) Field of Classification Search
CPC .. C10G 2300/1003; C10G 1/10; C10G 1/006; C10G 7/00; C08J 11/16; C08J 11/10; Y02W 30/705; B01J 29/06
(Continued)

(56) References Cited

U.S. PATENT DOCUMENTS

| 4,144,189 A | * | 3/1979 | Kirkbride | ................. B01J 8/42 |
| | | | | 204/157.15 |
| 4,851,601 A | | 7/1989 | Fukuda et al. | |

(Continued)

FOREIGN PATENT DOCUMENTS

| CA | 2202941 | 10/1998 |
| CA | 2202941 A1 * 10/1998 | .............. C08J 11/16 |

(Continued)

OTHER PUBLICATIONS

Hopewell, J. et. al. "Plastics recycling: challenges and opportunities", Phil. Trans. Soc. B. (2009), 364; pp. 2115-2126. (Year: 2009).*

(Continued)

*Primary Examiner* — In Suk C Bullock
*Assistant Examiner* — Aaron W Pierpont
(74) *Attorney, Agent, or Firm* — Ohlandt, Greeley, Ruggiero & Perle, L.L.P.

(57) ABSTRACT

A method having the following steps: subjecting plastic waste material to a thermal pre-treatment in order to produce
(Continued)

a liquid plastic mass, wherein the thermal pre-treatment of the plastic material is carried out in an inert gas atmosphere at a temperature that varies between 110° C. and 310° C.; simultaneously feeding the liquid plastic mass to a reaction apparatus; bringing the plastic mass into contact with a bed of particles of inorganic porous material contained inside the reaction apparatus at a temperature of between 300° and 600° C.; inducing thermocatalytic decomposition reactions at a temperature of between 300 and 600° C. in order to generate a mixture of hydrocarbons in a vapor phase; and separating the hydrocarbons from the vapor phase current generated inside the reaction means in order to produce a liquid mixture of hydrocarbons.

9 Claims, 4 Drawing Sheets

(51) Int. Cl.
    *C08J 11/16* (2006.01)
    *C10G 1/00* (2006.01)
    *C10G 7/00* (2006.01)
    *B01J 29/06* (2006.01)

(52) U.S. Cl.
    CPC ....... *B01J 29/06* (2013.01); *C10G 2300/1003* (2013.01); *Y02W 30/705* (2015.05)

(58) Field of Classification Search
    USPC .......................................... 585/241, 832, 801
    See application file for complete search history.

(56) References Cited

U.S. PATENT DOCUMENTS

| | | | | |
|---|---|---|---|---|
| 5,240,656 | A * | 8/1993 | Scheeres | B29B 13/022 |
| | | | | 219/421 |
| 5,672,794 | A * | 9/1997 | Northemann | C07C 4/22 |
| | | | | 585/240 |
| 5,686,066 | A | 11/1997 | Harada et al. | |
| 5,821,395 | A * | 10/1998 | Price | C10G 1/10 |
| | | | | 585/241 |
| 5,904,879 | A | 5/1999 | Winter et al. | |
| 6,018,085 | A * | 1/2000 | Ponsford | C07C 4/22 |
| | | | | 585/240 |
| 6,479,720 | B1 * | 11/2002 | O'Brien | C07C 15/00 |
| | | | | 208/354 |
| 6,559,086 | B1 * | 5/2003 | Takahashi | B01D 53/9418 |
| | | | | 502/74 |
| 6,822,126 | B2 * | 11/2004 | Miller | C10G 1/00 |
| | | | | 208/18 |
| 6,866,830 | B2 | 3/2005 | Kwak | |
| 7,531,703 | B2 | 5/2009 | Ramesh et al. | |
| 2001/0001781 | A1 * | 5/2001 | Drake | B01J 29/061 |
| | | | | 502/64 |
| 2002/0111521 | A1 * | 8/2002 | O'Rear | C10G 2/32 |
| | | | | 585/326 |
| 2007/0179326 | A1 | 8/2007 | Baker | |
| 2010/0036181 | A1 | 2/2010 | Diebold et al. | |
| 2010/0324232 | A1 * | 12/2010 | Mo | C10G 11/18 |
| | | | | 526/76 |
| 2011/0124938 | A1 * | 5/2011 | Inoue | B01J 23/755 |
| | | | | 585/533 |
| 2012/0160741 | A1 * | 6/2012 | Gong | C10G 1/002 |
| | | | | 208/113 |
| 2012/0165583 | A1 * | 6/2012 | Garforth | B01J 29/084 |
| | | | | 585/241 |
| 2012/0289753 | A1 * | 11/2012 | Luengo Marin | C08J 11/16 |
| | | | | 585/240 |
| 2012/0310023 | A1 | 12/2012 | Huang et al. | |
| 2013/0317238 | A1 * | 11/2013 | Mohanty | C07C 4/22 |
| | | | | 549/266 |
| 2014/0228606 | A1 * | 8/2014 | Narayanaswamy | C10G 1/10 |
| | | | | 585/241 |

FOREIGN PATENT DOCUMENTS

| | | |
|---|---|---|
| ES | 2168033 A1 | 5/2002 |
| JP | 2007154059 A * | 6/2007 |
| WO | 2005094990 A1 | 10/2005 |
| WO | 2006010324 A1 | 2/2006 |
| WO | 2009145884 A1 | 12/2009 |
| WO | 2013015676 A2 | 1/2013 |

OTHER PUBLICATIONS

International Search Report dated Feb. 5, 2014 from corresponding PCT/MX2013/0000095, 7 pages.

* cited by examiner

METHOD AND EQUIPMENT FOR PRODUCING HYDROCARBONS BY CATALYTIC DECOMPOSITION OF PLASTIC WASTE PRODUCTS IN A SINGLE STEP

FIELD OF THE INVENTION

The present invention relates to the elimination of plastic waste products and, more specifically, to a method and equipment for decomposing plastic material and converting it into valuable chemicals and hydrocarbons.

PRIOR ART

Plastics are materials widely used by man with various applications, among them the manufacture of containers, packagings, electronics, construction materials, textiles, among others. As a consequence of their intensive use, large quantities of plastic waste products are generated, primarily in urban centers. Mexico generates more than 2 million tons a year of plastic waste products (INEGI, 2011), the majority of them being made up of the plastics polystyrene (PS), polypropylene (PP), polyethylene (PE, LDPE, HDPE), polyethylene terephthalate (PET) and polyvinyl chloride (PVC), and they normally end up in sanitary land fills or outdoor dump sites.

Given the issues of their generation and accumulation, various techniques have been developed to extract value from these waste products. The recycling of plastics is the most common technique, in which the waste product is used as a raw material for the making of new products; however, its scope is limited by the great variability in the characteristics of the plastic waste products (color, density, texture, loss of physical properties), which makes it difficult to obtain a homogeneous raw material.

Recycling is normally carried out by grinding up the waste products to form pellets, flakes and other small particles which are used to make products such as carpets or coverings. Other techniques exist whose objective is to depolymerize the plastic waste products into their precursor monomers. Such is the case with heat treatment such as thermal cracking. In this way it is possible to reverse the polymerization of the plastics by breaking chains and releasing monomers. Even so, the chain lengths of the monomers obtained by these techniques are not uniform, so that they are usually not useful in the production of new plastics. Another disadvantage of thermal cracking is the formation of coke and inorganic carbon, which increases the maintenance costs of the reaction equipment and adds impurities to the product, in addition to being energy intensive, which represents high operating costs.

With the goal of improving the results of thermal cracking, catalytic cracking emerged, in which one tries to give a certain uniformity to the monomers obtained. Catalytic cracking normally takes place in two stages, one involving primarily thermal cracking and a second stage in which the gaseous products of the thermal cracking are placed in contact with a catalyst, either in a fluidized bed reactor or a packed bed reactor. Nevertheless, catalytic cracking in two stages is not able to overcome the formation of inorganic carbon in the reactor and generates for the most part waxy products of little value.

More recent techniques have given up the focus on recycling of plastics for the production of monomers, instead applying the above-described techniques to the production of fuels. One example is U.S. Pat. No. 7,531,703, which carries out a catalytic cracking in two steps, employing organometallic (metallocene) compounds as catalysts. This method generates a liquid fuel of selective form, yet still the cost of the organometallic catalysts—inorganic nonporous compounds characterized by metal/carbon bonds—do not allow a profitable method.

U.S. Pat. No. 5,686,066 entitled "Process for recovering phthalic anhydride and hydrogen chloride from plastic materials" discloses a method which uses at least two gasifiers for the thermal cracking and two reactors for the catalytic cracking. The catalytic cracking method is carried out in the gas phase.

U.S. Pat. No. 4,851,601 entitled "Processing for producing hydrocarbon oils from plastic waste" discloses a method of cracking in two stages, the first one being a thermal cracking in a tank with agitation followed by a catalytic cracking in a packed bed. A catalyst ZSM-5 is used during the catalytic cracking, having a particle size between 0.1 and 10 mm, and it is used in conjunction with a binder such as alumina, silica, or silica-alumina.

The US Publication US2010/036181 A1 entitled "Conversion of biomass feedstocks into hydrocarbon liquid transportation fuels" discloses a method which consists in the gasification of the raw material that contains carbon (principally biomass or methane) to produce syngas, which then reacts by means of Fischer-Tropsch (F-T) to yield liquid fuels. The method further involves a catalytic cracking reactor to convert the long chains resulting from the F-T into smaller hydrocarbons and then a hydrogenation reactor to obtain a large quantity of paraffinic hydrocarbons.

International Publication WO2006 010324 A1 entitled "A process for producing fuels from plastic waste by catalytic cracking" discloses a process for producing fuels from plastic waste that operates at atmospheric pressure. The waste plastic is melted by means of a screw-type extruder. The catalytic pyrolysis stage is carried out in an autoclave (agitated reactor) in which the molten plastic is vaporized and the fumes pass through a packed bed to produce olefins.

International Publication WO2005 094990 A1 entitled "A catalyst composition for catalytic cracking of waste plastic" discloses a synthetic catalyst for use in catalytic cracking and a process for the catalytic cracking of plastic residues. The process requires the plastic residues previously ground up to be mixed with a certain percentage by weight of the synthetic catalyst and this mixture is the one that is subjected to the catalytic cracking.

U.S. Pat. No. 5,904,879 entitled "Partial oxidation of waste plastic material" discloses a method of gasification and partial oxidation in which the material must necessarily include halogenated compounds (e.g., PVC), resulting in the production of syngas ($CO+H_2$), halogenated compounds, and slag as intermediate products.

U.S. Pat. No. 6,866,830 entitled "System for continuously preparing gasoline, kerosene and diesel oil from waste plastic" discloses a method consisting of two catalytic reactions: 1) dehydrogenation and decomposition of waste plastics, a catalytic reaction which uses nickel (a high-priced metal catalyst); and 2) fluidized catalytic cracking using a zeolite (solid acidic aluminosilicate) as the catalyst. The method uses steam in the fluidized catalytic cracking to eliminate the oil present in the catalyst particles. It further includes the regeneration of the zeolite catalyst based on nickel, molybdenum and air.

U.S. Publication No. 2007/179326 A1 entitled "Process and plant for conversion of waste material to liquid fuel" describes a process which first thermally pyrolyzes (converts the waste plastics to the gas phase) and then transforms the fumes catalytically in a second step. The process includes a carbon remover in the bottom of the pyrolysis chamber. This excess carbon is formed by first carrying out the complete thermal pyrolysis and then the catalytic conversion is conducted separately. The temperature during the catalytic reaction is restricted to a range of 350 to 425° C.

U.S. Publication No. 2012/310023 A1 entitled "Methods of producing liquid hydrocarbon fuels from solid plastic wastes" discloses a method of production of liquid fuels in which: the waste plastic (solid or molten) is mixed with a metal hydride and a catalyst impregnated with a metal; the mixture is gasified (partial oxidation); and the liquid fuels are produced. The catalyst substrate can be selected from aluminum oxide, silicon oxide, zeolite, zirconium, magnesium oxide, titanium oxide, activated charcoal, clays, or a combination. The impregnated metal can be selected from: Pt, Pd, Ir, Ru, Rh, Ni, Co, Fe, Mn, Mg, Ca, Mo, Ti, Zn, Al, Pt—Pd alloy, Pt—Ru alloy, Pt—Pd—Ru alloy, Pt—Co alloy, Co—Ni alloy, Co—Fe alloy, Ni—Fe alloy, Co—Ni—Fe alloy, or a combination.

International Publication WO 2009/145884 A1 entitled "Method for converting waste plastic to hydrocarbon fuel materials" describes a method of conversion by batches in which the melting of plastics is carried out in an aerobic atmosphere at high temperature (370 to 420° C.) to form an aqueous paste or "slurry" and induce thermal cracking. The method includes a single distillation of the slurry to generate hydrocarbons and the residue is recirculated with the input slurry. In the preferred modality, a catalyst is used (they mention the commercial zeolite base HZSM-5), which is added to the slurry and recirculated together with the residue. In another modality, a second distillation of the product obtained from the first distillation is performed.

One drawback of the thermal cracking processes of the prior art is that they require very elevated temperatures to achieve the decomposition of the waste polymer material.

An additional drawback of the current processes is that, after carrying out the thermal cracking, the vapor phase is made to pass through a bed to achieve a catalytic cracking, that is, two stages. One drawback of thermal cracking and catalytic cracking in 2 stages is that it requires higher temperatures (around 800° C.) during the thermal pyrolysis, and furthermore it has the drawback of promoting the formation of coke, which is a residue of low value and a contaminant to the catalyst used in the catalytic stage.

Yet another drawback of the processes of the prior art is the lack of control over the distribution of the family of products.

The current depolymerization processes are based on synthetic catalysts and not the use of natural catalysts such as natural zeolite and/or spent catalysts (giving them a reuse and avoiding one more pollutant). In addition, they do not use contaminated waste plastics (for example, those containing oils), since they produce coke or low value products.

Taking into account the deficiencies of the prior art, an object of the present invention is to achieve the decomposition of the plastic material in a single step, by inducing thermo-catalytic reactions to generate hydrocarbons (fuels and chemicals of high value).

Another object of the present invention is to provide a process and equipment for the production of hydrocarbons by catalytic decomposition of plastic waste products in a single step in which the catalytic cracking in liquid state requires lower temperatures in order to prevent the breaking into chains with a small number of carbons.

Still another object of the present invention is to provide a process and equipment for the production of hydrocarbons by catalytic decomposition of plastic waste products having a distribution of products more heavily weighted toward the liquid portion (and, if desired, waxes), since the primary objective is to obtain fuels and/or liquid chemicals.

Yet another object of the present invention is to provide a process and equipment for the production of hydrocarbons by catalytic decomposition of plastic waste products which works at atmospheric pressures and avoids the use of reducing agents.

Yet another object of the present invention is to provide a process and equipment for the production of hydrocarbons by catalytic decomposition of plastic waste products whose process focuses on depolymerization of polyolefins, polystyrene and PET to obtain premium fuels (principally gasoline and diesel), styrene, and chemicals that can be sold as materials for the chemical industry.

Finally, another object of the present invention is to use a natural zeolite catalyst as well as reuse a spent synthetic zeolite for the production of hydrocarbons by catalytic decomposition of plastic waste products in a single step.

BRIEF DESCRIPTION OF THE INVENTION

The present invention pertains to a process for the production of hydrocarbons by catalytic decomposition of plastic waste products in a single step, involving: subjecting the plastic waste product to thermal pretreatment in order to produce a liquid plastic mass, wherein the thermal pretreatment of the plastic material is carried out in an inert gas atmosphere at a temperature varying between 110° C. and 310° C.; simultaneously feeding the liquid plastic mass to a reaction apparatus; placing the plastic mass in contact with a bed of particles of porous inorganic material contained within the reaction apparatus at a temperature of 300° C. to 600° C.; inducing reactions of thermal-catalytic decomposition at a temperature between 300° C. and 600° C. to generate a mixture containing hydrocarbons in the vapor phase; and separating the hydrocarbons from the vapor phase current generated within the reaction medium to produce a liquid mixture of hydrocarbons.

An additional aspect of the present invention relates to equipment for the production of hydrocarbons by catalytic decomposition of plastic waste products in a single step, comprising an apparatus for thermal treatment of the plastic waste material to produce a liquid plastic mass; an apparatus to carry out the catalytic decomposition of the liquid plastic mass and produce a mixture of hydrocarbons in the vapor phase; and an apparatus for separating the hydrocarbons having 5 to 44 carbon atoms from the vapor phase current generated inside the apparatus, carrying out the catalytic decomposition to produce a liquid mixture of hydrocarbons.

BRIEF DESCRIPTION OF THE DRAWINGS

The aspects that are considered to be characteristic of the present invention shall be established in particular in the appended claims. Nevertheless, the invention itself, both in its organization and in its method of operation, together with other objects and advantages of the same, shall be better understood in the following description of certain embodiments, taken in conjunction with the accompanying drawings, in which:

DETAILED DESCRIPTION OF THE INVENTION

The present invention comprises a process and equipment for decomposing plastic material and converting it into hydrocarbons (fuels and/or chemicals of industrial utility). Said decomposition is of a catalytic nature, wherein the plastic material is subjected to a thermal pretreatment accompanied by an inert gas to produce a liquid mass, which is fed simultaneously into a packed bed reactor to bring the pretreated plastic material in the liquid state into contact with particles of catalytic material in order to perform the catalytic conversion in this way, taking care to control the different temperatures in order to obtain a mixture of hydrocarbons in the vapor phase, so that afterwards liquid products that can be used as chemicals or fuels can be obtained.

Generally, the plastic material used in the process that has been developed can come from any origin; however, it is emphasized that the process is able to convert plastic waste products including plastics contaminated with oils and pigments, since these constitute a serious environmental problem. Also disclosed is equipment in which the process can be carried out, without this disclosure representing a limitation on the type of equipment required to carry out the process. Both the process and the equipment of the present invention are described below.

In one embodiment, the process of the present invention comprises the steps of subjecting to thermal pretreatment 1 the plastic waste material 10 in order to produce a liquid plastic mass, wherein the thermal pretreatment of the plastic material is carried out in an inert gas atmosphere 11 at a temperature varying between 110° C. and 310° C., and wherein the pretreatment time depends on the type of plastic material and the plastic mass being liquefied. The purpose of the pretreatment under an inert gas atmosphere is to avoid any oxidation and consequently to avoid a premature degradation into unwanted compounds such as synthesis gas or compounds of low molecular weight. When the plastic material feedstock is composed of a mixture of different plastics, the process typically includes an additional step of homogenization of the liquid plastic mass in order to produce a mixture of hydrocarbons of consistent composition during the process.

Figure 1:
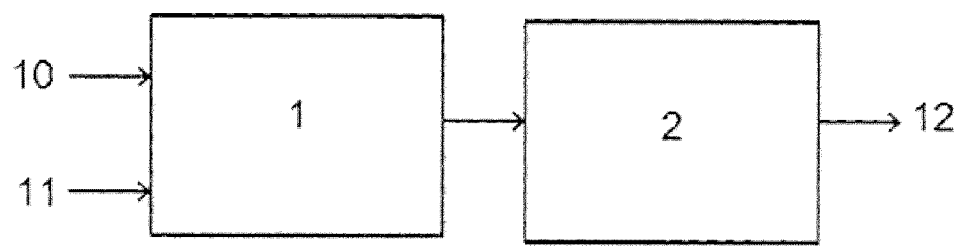
FIG. 1 is a block diagram showing the stages of the thermal-catalytic decomposition reaction generating a mixture of hydrocarbons in the vapor phase.

The homogenized liquid plastic mass is simultaneously fed to a reaction apparatus 2, such as a closed tank, reactor, or the like. In a preferred embodiment, the reaction apparatus is a packed bed reactor, a fluidized bed reactor, or a mixed flow reactor. As the liquid plastic mass flows inside the reaction medium of packed bed type, the plastic mass is brought into contact with the bed of particles of inorganic porous material with catalytic activity in a medium free of oxygen at a temperature of 300° C. to 600° C. In this way, reactions of thermocatalytic decomposition are induced, generating a mixture 12 containing hydrocarbons in the vapor phase (see FIG. 1). The decomposition reactions occur at temperatures ranging from 300° C. to 600° C., preferably at a temperature varying between 450° C. and 550° C.

The particle size of the bed of inorganic porous material can be between 30 and 10,000 microns, preferably between 50 and 2000 microns, and more preferably between 60 and 1500 microns. This material can be composed of synthetic or natural aluminosilicates or a combination of the two. Aluminosilicates are porous materials with acidic active centers which give them very good catalytic activity, so that they are active in carrying out the decomposition of the liquid mass in the process of the present invention. Preferably, the natural aluminosilicates and the spent synthetic ones have the following characteristics: Si/Al molar ratios between 3 and 40 and pore diameters between 0.5 and 50 nm and specific surface area between 15 and 1000 $m^2/g$.

The vapor phase generated by the thermocatalytic decomposition reaction comprises hydrocarbons of between 1 and 44 carbon atoms in their structure, preferably between 1 and 4 carbon atoms in their structure (non-condensable) and between 5 and 44 carbon atoms in their structure (condensable).

In one embodiment of the process where natural aluminosilicates are used, the condensable hydrocarbons obtained are primarily aliphatic. In the embodiment of the process using spent synthetic aluminosilicates, one obtains a greater quantity of aromatic hydrocarbons in the condensable fraction. Ideally, one can use combinations of natural aluminosilicates and spent synthetic aluminosilicates in the process, being able to modify the proportions of these as well as the operating conditions to adjust the composition of the final mixture of hydrocarbons (see Examples 1 to 3).

Figure 2:
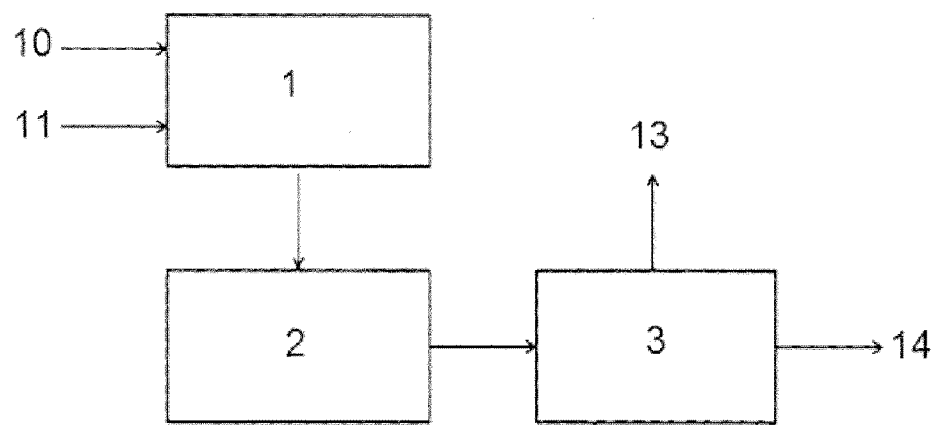
FIG. 2 is a block diagram showing the stage of separation of the hydrocarbons from the vapor phase current.

The process for decomposing the plastic material and converting it into hydrocarbons and/or chemicals of industrial utility includes the step of separating the hydrocarbons 3 having between 5 and 44 carbon atoms from the vapor phase current 13 generated within the reaction medium to produce a liquid mixture 14 of hydrocarbons (see FIG. 2). The separation can be carried out by any physical or chemical method which allows a condensation of this mixture, preferably by indirect heat exchange with a refrigerant fluid. The non-condensable vapors can be used to generate electrical energy or even thermal energy by combustion, or they can be treated in order to be separated by known physical or chemical techniques (such as liquefaction). The liquid mixture of hydrocarbons can be subjected to an additional fractionation stage, preferably by distillation, in order to separate liquid chemicals and/or hydrocarbons with value as industrial chemicals or with characteristics classified as gasoline, jet fuel, kerosene, gas oil and/or fuel oil.

Figure 4:
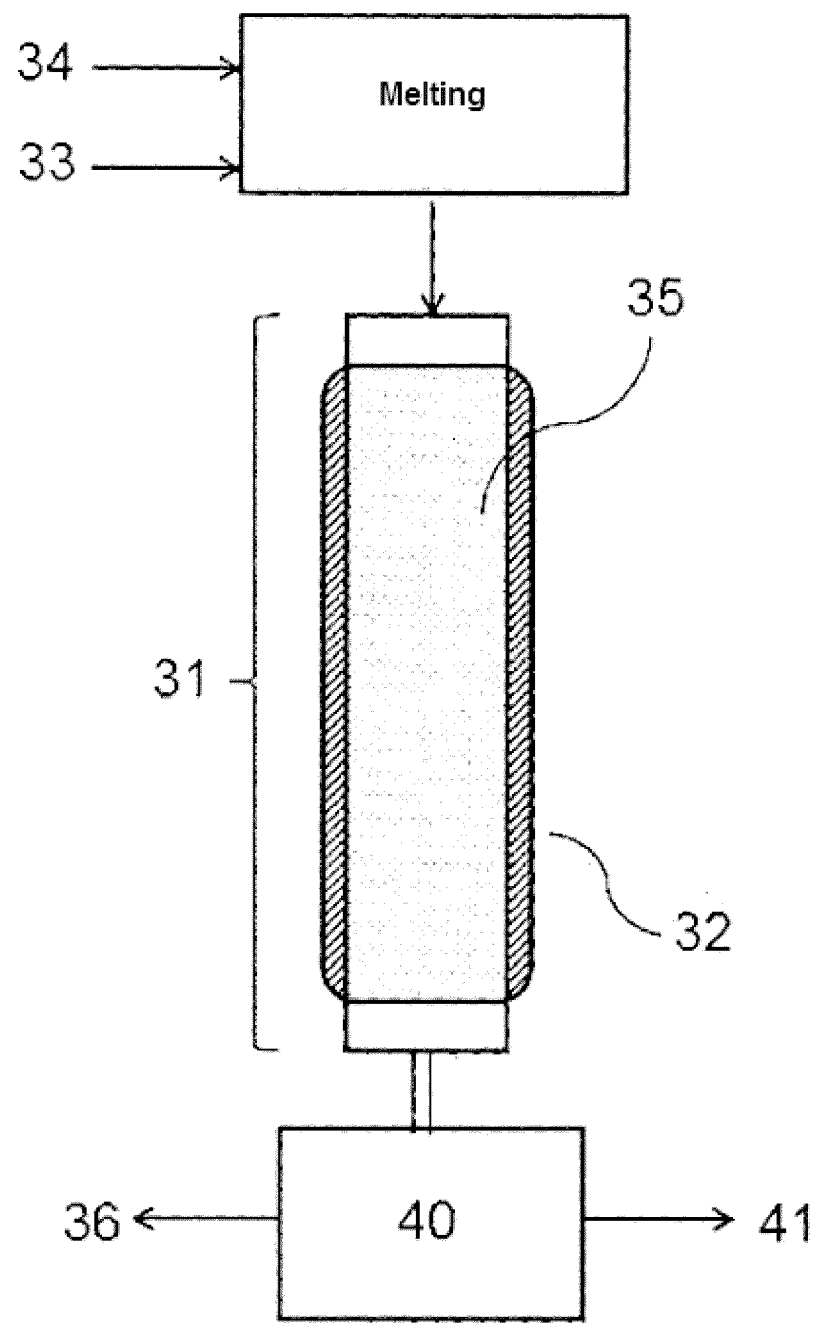
FIG. 4 is an illustration showing schematically one embodiment of the equipment to carry out the process of catalytic decomposition in a continuous manner.

The equipment designed to carry out the process of catalytic decomposition preferably operates in a continuous manner. The equipment for the production of hydrocarbons by catalytic decomposition of plastic waste products in a single step comprises: an apparatus 1 for thermal treatment of the plastic waste material to produce a liquid plastic mass; an apparatus 2 to carry out the catalytic decomposition of the liquid plastic mass and produce a mixture of hydrocarbons in the vapor phase; and an apparatus 3 for separating the hydrocarbons with 5 to 44 carbon atoms from the vapor phase current generated inside the apparatus carrying out the catalytic decomposition to produce a liquid mixture of hydrocarbons. In one embodiment, the equipment for the production of hydrocarbons by catalytic decomposition of plastic waste products can include a second separator apparatus to separate the condensable fraction of the gaseous product (see FIG. 4). Optionally, the separated liquid goes to a fractionation apparatus, such as a fractionation column, in which a fractional distillation occurs to separate the components of interest or liquid fuels such as gasoline, jet fuel, kerosene, gas oil and fuel oil.

The apparatus for heat treatment of the material comprises means of feeding an inert gas to generate an inert gas atmosphere and heating means for heat treatment of the plastic waste material at a temperature that can lie between 110° C. and 310° C. and thereby to produce a liquid plastic mass.

Figure 3:
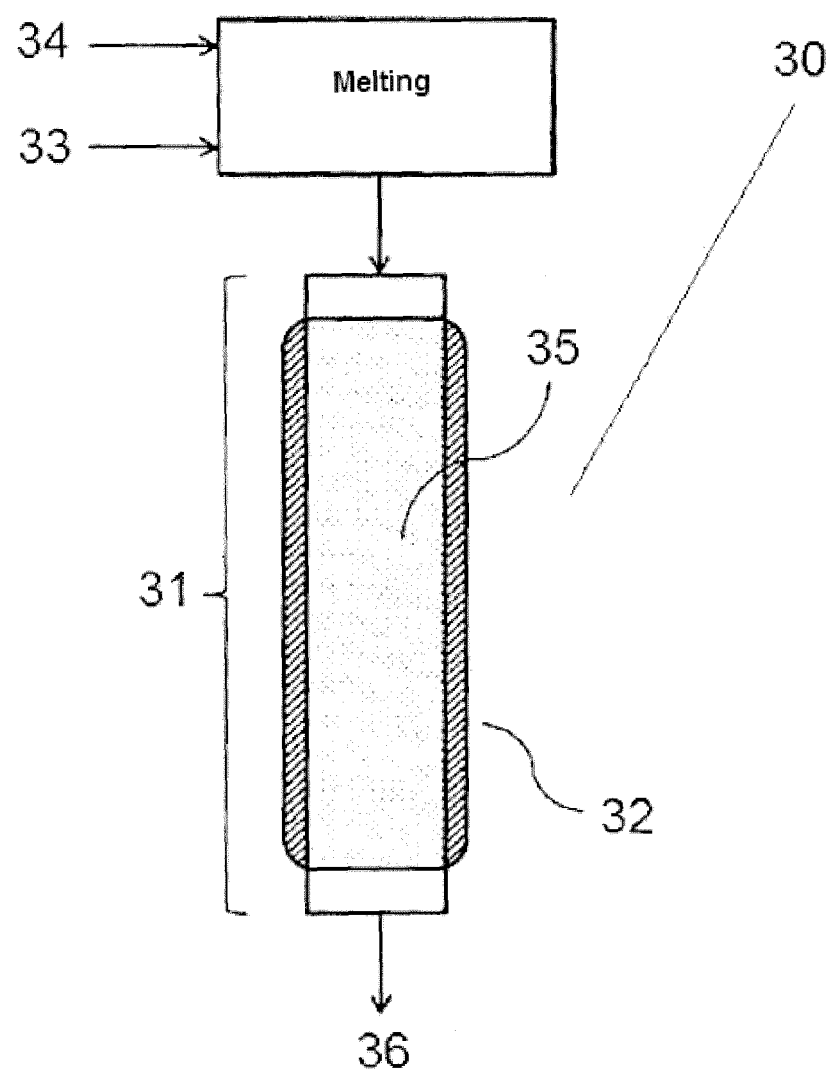
FIG. 3 is an illustration showing schematically the equipment for carrying out the process of catalytic decomposition in continuous duty.
Figure 5:
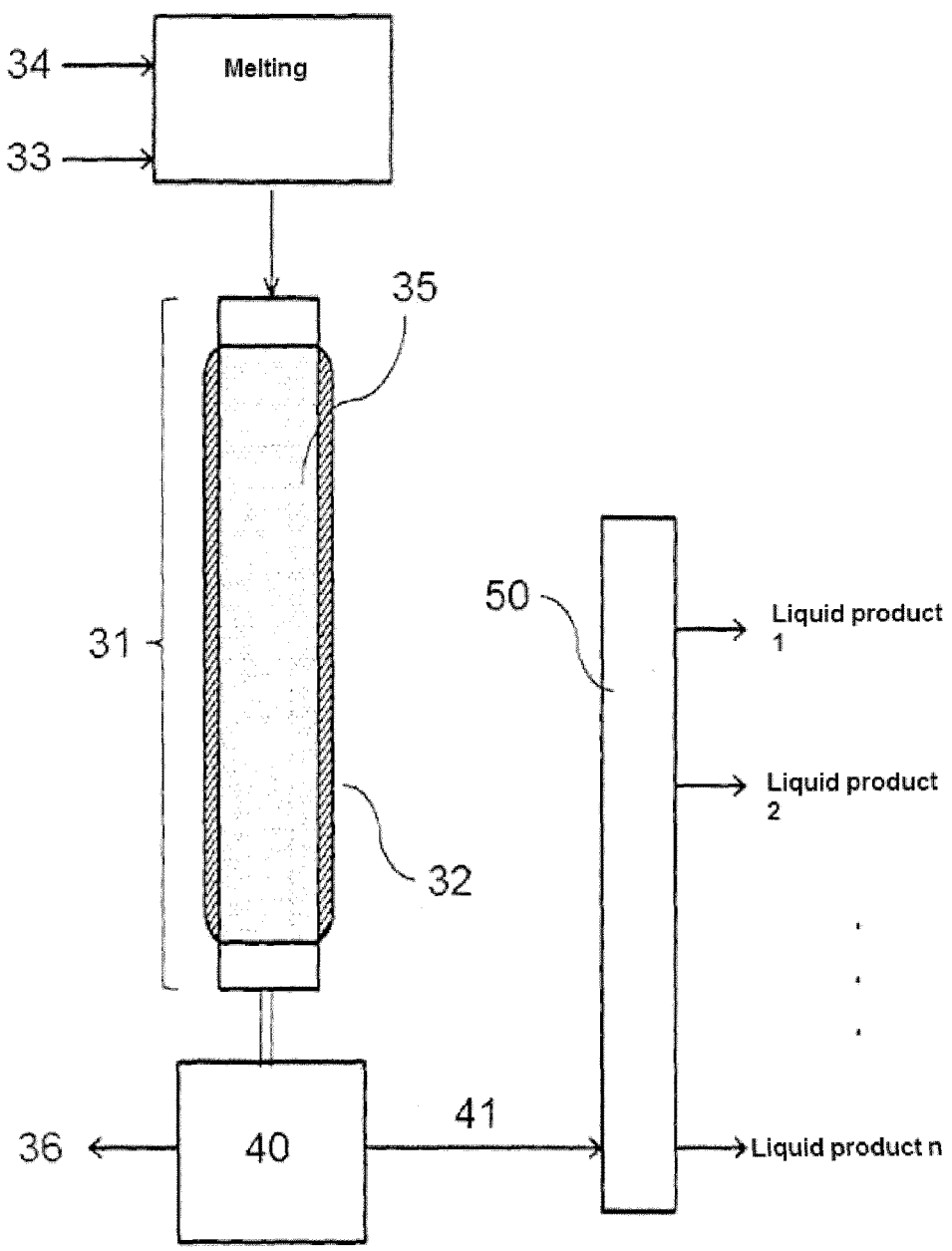
FIG. 5 is an illustration showing schematically one additional embodiment of the equipment for carrying out the process of catalytic decomposition in a continuous manner.

In a particularly preferred embodiment of the present invention, the apparatus to carry out the catalytic decomposition of the liquid plastic mass and produce a mixture of hydrocarbons in the vapor phase can be selected from among a packed bed reactor, a fluidized bed reactor, or a mixed flow reactor. FIG. 3 shows a preferred apparatus 30 for carrying out the catalytic decomposition in accordance with the present invention, being a tubular packed bed reactor 31. The tubular packed bed reactor comprises a heating source 32 to heat the reactor in a uniform manner and to provide the adequate quantity of heat to maintain the reaction temperature (preferably 300° C. to 600° C.) in the packed bed. The reactor can be heated indirectly with steam, combustion gases, or any other heating fluid, although combustion gases are used preferably. An inert gas 33 is used to maintain a reduced or oxygen-free atmosphere inside the reactor. The plastic material 34, pretreated and in the liquid state, which is treated in the apparatus for heat treatment of the material, is then fed in and flows through the packed bed 35 inside the reactor where it is brought into contact with the particles of catalytic material to bring about the catalytic conversion in this way, making sure to control the different temperatures in order to obtain a mixture of hydrocarbons in the vapor phase, after which one can obtain liquid products that can be used as chemicals or fuels. At the exit from the reactor, a gaseous current 36 is obtained, which can optionally be taken to a second module 40 composed of a condenser to separate the condensable fraction 41 from the gaseous product 36 (see FIG. 4). Optionally, the separated liquid goes to a third module 50, composed of a fractionation column in which a fractional distillation is performed to separate the components of interest or liquid fuels such as gasoline, jet fuel, kerosene, gas oil and/or fuel oil (See FIG. 5).

ILLUSTRATIVE EXAMPLES

Example 1

The method was tested by decomposing a mixture of low density polyethylene, high density polyethylene and polypropylene in mass fractions of 26%, 38% and 36%, respectively, using a natural zeolite as the catalytic material, varying the conditions of reactor temperature and ratio of catalyst weight to flow of plastic feedstock material (W/F), as shown in the following table, along with the composition of condensable product:

|  | Temperature | | |
| --- | --- | --- | --- |
|  | 515° C. | 525° C. W/F | 525° C. |
| Composition of condensable product | 76 min wt. % | 60 min wt. % | 46 min wt. % |
| $C_5$-$C_{12}$ | 90.9% | 83.8% | 75.9% |
| $C_{13}$-$C_{14}$ | 1.6% | 3.8% | 3.4% |
| $C_{15}$-$C_{17}$ | 2.3% | 3.8% | 5.6% |
| $C_{18}$-$C_{28}$ | 4.7% | 7.4% | 12.8% |
| >$C_{29}$ | 0.5% | 1.2% | 2.3% |

Example 2

The method was tested by decomposing a mixture of low density polyethylene, high density polyethylene and polypropylene in the same proportions as in Example 1, using a synthetic zeolite as the catalytic material, varying the conditions of reactor temperature and ratio of catalyst weight to flow of plastic feedstock material (W/F), as shown in the following table, along with the composition of condensable product:

|  | Temperature | | | |
| --- | --- | --- | --- | --- |
|  | 500° C. | 450° C. W/F | 450° C. | 425° C. |
| Composition of condensable product | 213 min wt. % | 341 min wt. % | 262 min wt. % | 339 min wt. % |
| $C_5$-$C_{12}$ | 99.4% | 99.5% | 99.7% | 98.7% |
| $C_{13}$-$C_{14}$ | 0.6% | 0.5% | 0.3% | 1.3% |
| $C_{15}$-$C_{17}$ | — | — | — | — |
| $C_{18}$-$C_{28}$ | — | — | — | — |
| >$C_{29}$ | — | — | — | — |
| Total aliphatic | 16.6% | 24.5% | 26.0% | 37.4% |
| Total aromatic | 83.4% | 75.5% | 74.0% | 62.6% |

Example 3

The method was tested by decomposing a mixture of low density polyethylene, high density polyethylene and polypropylene in the same proportions as in Example 1, using a mixture of synthetic and natural aluminosilicates as the catalytic material in a mass ratio of 2.85:1. The plastic feed rate and the ratio of catalyst weight to flow of plastic feedstock material (W/F) was varied, as shown in the following table, along with the composition of condensable product:

|  | Temperature | | |
| --- | --- | --- | --- |
|  | 500° C. | 500° C. W/F | 500° C. |
| Composition of condensable product | 107 min wt. % | 67 min wt. % | 62 min wt. % |
| $C_5$-$C_{12}$ | 63.4% | 67.5% | 70.1% |
| $C_{13}$-$C_{14}$ | — | 3.2% | 3.4% |
| $C_{15}$-$C_{17}$ | — | 2.2% | 4.5% |
| $C_{18}$-$C_{28}$ | — | 0.4% | 4.0% |
| >$C_{29}$ | — | — | — |
| Nitrogenated compounds | 33.5% | 21.6% | 13.1% |
| Total aliphatic | 29.8% | 55.4% | 66.0% |
| Total aromatic | 67.0% | 39.5% | 29.2% |

Example 4

The method was tested by decomposing expandable polystyrene, using a mixture of natural zeolite as the catalytic material, varying the conditions of reactor temperature and ratio of catalyst weight to flow of plastic feedstock material (W/F), as shown in the following table, along with the composition of condensable product:

|  | Temperature | |
| --- | --- | --- |
|  | 475° C. | 495° C. |
|  | W/F | |
| Composition of condensable product | 177 min wt. % | 132 min wt. % |
| Styrene | 28.3% | 26.4% |
| Ethylbenzene | 17.7% | 19.7% |
| Methylstyrene | 12.3% | 13.1% |
| Toluene | 11.2% | 12.1% |
| Other aromatic compounds | 29.7% | 28.1% |
| Other aliphatic compounds | 0.7% | 0.6% |

Even though a specific embodiment of the present invention has been shown and described as an example, it should be understood that it is amenable to various modifications and alternative forms, without departing from the spirit and scope of the present invention. Therefore, the intention is not to limit the invention to the particular form described, but rather to include all modifications, equivalents, and alternatives coming under the scope of the invention as stated in the appended claims.

The invention claimed is:

1. A continuous process for the production of aliphatic and aromatic hydrocarbons comprising:
    i.) thermally pretreating a plastic waste material contaminated with oils and/or pigments in an inert gas atmosphere at a temperature between 260° C. and 325° C. to produce a contaminated liquid plastic mass, wherein the plastic waste material contaminated with oils and/or pigments is a single plastic or a mixture of different plastics;
    ii.) homogenizing the contaminated liquid plastic mass to produce a homogenized contaminated liquid plastic mass;
    iii.) feeding the homogenized contaminated liquid plastic mass to a reaction apparatus containing a bed of particles of porous material, wherein the reaction apparatus is selected from the group consisting of a packed bed reactor, a fluidized bed reactor, and a mixed flow reactor and wherein the particles of porous material comprise both natural porous aluminosilicates and spent porous synthetic aluminosilicates;
    iv.) thermocatalytically decomposing the homogenized contaminated liquid plastic mass by contacting the homogenized contaminated liquid plastic mass with the bed of particles of porous material at a temperature between 460° C. and 550° C. and at atmospheric pressure to generate a gaseous mixture containing aliphatic hydrocarbons having between 1 and 44 carbon atoms and aromatic hydrocarbons having between 1 and 44 carbon atoms; and
    v.) separating the gaseous mixture to obtain a liquid mixture of hydrocarbons and a non-condensable stream of hydrocarbons.

2. The process according to claim 1, wherein the gaseous mixture comprises hydrocarbons having between 3 and 35 carbon atoms.

3. The process according to claim 1, wherein the size of the particles in the bed of particles of porous material is in the range of 30 to 10,000 microns.

4. The process according to claim 1, wherein the natural aluminosilicates and spent porous synthetic aluminosilicates each have the following characteristics: (i) a Si/Al molar ratio between 3 and 40, (ii) a pore diameter between 0.5 and 50 nm, and (iii) a specific surface area between 15 and 1000 $m^2/g$.

5. The process according to claim 1, wherein modification of the relative proportion of natural porous aluminosilicates to spent porous synthetic aluminosilicates adjusts the composition of the liquid mixture of hydrocarbons.

6. The process according to claim 1, wherein the liquid mixture of hydrocarbons comprises hydrocarbons having between 5 and 44 carbon atoms.

7. The process according to claim 1, wherein the separating step comprises fractionating the gaseous mixture by distillation to produce a gasoline fraction, a jet fuel fraction, a kerosene fraction, a gas oil fraction, and/or a fuel oil fraction.

8. The process according to claim 1, wherein the plastic waste material contaminated with oils and/or pigments is composed primarily of polypropylene, polyethylene, polystyrene, polyethylene terephthalate, or a mixture thereof.

9. The process according to claim 8, wherein the plastic waste material contaminated with oils and/or pigments is composed primarily of polypropylene and polyethylene.

* * * * *